(12) United States Patent
Hung

(10) Patent No.: US 8,170,370 B2
(45) Date of Patent: May 1, 2012

(54) METHOD AND APPARATUS OF PROCESSING INTERLACED VIDEO DATA TO GENERATE OUTPUT FRAME BY BLENDING DEINTERLACED FRAMES

(75) Inventor: Hao-Ping Hung, Kaohsiung County (TW)

(73) Assignee: CyberLink Corp., Xindian Dist., New Taipei (TW)

( * ) Notice: Subject to any disclaimer, the term of this patent is extended or adjusted under 35 U.S.C. 154(b) by 817 days.

(21) Appl. No.: 12/327,816

(22) Filed: Dec. 4, 2008

(65) Prior Publication Data

US 2010/0142760 A1 Jun. 10, 2010

(51) Int. Cl.
*G06K 9/36* (2006.01)
*H04N 7/01* (2006.01)

(52) U.S. Cl. ...................................... 382/284; 348/452

(58) Field of Classification Search .................. 382/107, 382/274, 284; 348/441, 448, 449, 452, 459
See application file for complete search history.

(56) References Cited

U.S. PATENT DOCUMENTS

| 5,005,078 A | 4/1991 | Gillard | 358/140 |
| 5,093,721 A | 3/1992 | Rabii | 358/135 |
| 5,428,397 A | 6/1995 | Lee et al. | 348/448 |
| 5,519,451 A | 5/1996 | Clatanoff et al. | 348/606 |
| 5,532,750 A | 7/1996 | De Haan et al. | 348/452 |
| 6,380,978 B1 | 4/2002 | Adams et al. | 348/452 |
| 6,515,706 B1 | 2/2003 | Thompson et al. | 348/448 |
| 7,064,790 B1 * | 6/2006 | Varma et al. | 348/441 |
| 2002/0191105 A1 * | 12/2002 | Walters | 348/448 |
| 2005/0206786 A1 * | 9/2005 | Leaback | 348/452 |
| 2008/0165278 A1 * | 7/2008 | Zhang | 348/452 |

* cited by examiner

*Primary Examiner* — Andrew W Johns
(74) *Attorney, Agent, or Firm* — Winston Hsu; Scott Margo

(57) ABSTRACT

A method of processing interlaced video data including a first interlaced field and a second interlaced field is provided. The method includes performing a deinterlacing operation upon the interlaced video data to generate a first deinterlaced frame corresponding to the first interlaced field and to generate a second deinterlaced frame corresponding to the second interlaced field; performing motion estimation according to video information derived from the interlaced video data to generate a motion estimation result; and performing a blending operation upon the first deinterlaced frame and the second deinterlaced frame to generate an output frame. The blending operation is based on the motion estimation result, and the output frame replaces the second deinterlaced frame. Specifically, the first interlaced field is immediately followed by the second interlaced field.

20 Claims, 8 Drawing Sheets

METHOD AND APPARATUS OF PROCESSING INTERLACED VIDEO DATA TO GENERATE OUTPUT FRAME BY BLENDING DEINTERLACED FRAMES

BACKGROUND OF THE INVENTION

1. Field of the Invention

The present invention relates to processing interlaced video data to generate a deinterlaced output, and more particularly, to a method and apparatus of processing interlaced video data to generate each output frame corresponding to an interlaced field through blending deinterlaced frames.

2. Description of the Prior Art

In conventional interlaced scanning, an odd field composed of pixels located in odd scan lines and an even field composed of pixels located in even scan lines are successively scanned and generated. Recently, progressive scan technique, which is also referred to as non-interlaced scan, generates frames for the odd field and the even field respectively and then scans the frames using double scan frequency in sequence to display the video contents on a display screen. In this way, the quality of the displayed image can be improved greatly. In order to display video data in progressive scan, a deinterlacing operation for converting an interlacedly scanned video input into a sequentially (progressively) scanned video output is required. Specifically, the deinterlacing operation is configured to interpolate a new scan line between two successive scan lines within a field.

Nowadays, the deinterlacing technique becomes more and more important due to the popularity of LCD apparatuses, such as LCD monitors and televisions. In general, the conventional analog television signal, complying with NTSC standard or PAL standard, carries an interlaced content, whereas the video displayed on the LCD apparatuses is a progressive content. Therefore, the deinterlacing technique is commonly employed by an LCD apparatus to convert interlaced fields into deinterlaced frames. Please refer to FIG. 1. FIG. 1 is a diagram illustrating a conventional deinterlacing operation. As shown in FIG. 1, an interlaced field FI(n−1) is an even field (also called bottom field) including pixels located in even scan lines L2, L4, L6, L8, L10 of an original frame FR_I(n−1), and an interlaced field FI(n) immediately following the interlaced field FI(n−1) is an odd field (also called top field) including pixels located in odd scan lines L1, L3, L5, L7, L9 of an original frame FR_I(n) immediately following the original frame FR_I(n−1) in time domain. For example, the original frames FR_I(n−1) and FR_I(n) could be obtained from capturing a scene using an image capturing device. As shown in FIG. 1, the original frames FR_I(n−1) and FR_I(n) are derived from capturing a still scene. Therefore, original frames FR_I(n−1) and FR_I(n) have the same image content.

After the interlaced video data, including the interlaced fields FI(n−1) and FI(n), are transmitted from a source end (e.g., a TV service provider) to a receiver end (e.g., a television), a deinterlacer 102 is implemented to generate deinterlaced frames through processing the incoming interlaced video data according to a specific deinterlacing technique. For example, the deinterlacer 102 adopts an edge-adaptive deinterlacing technique to generate a deinterlaced frame FR_D(n−1) corresponding to the interlaced field FI(n−1) that is extracted from the received interlaced video data, and a deinterlaced frame FR_D(n) corresponding to the interlaced field FI(n) that is extracted from the received interlaced video data.

Regarding the video deinterlacing applied to the odd fields and even fields, the missed scan lines (e.g., odd scan lines missing in the even field, or even scan lines missing in the odd field) are generated according to the pixels located in the neighboring scan lines and estimated edge directions. However, under certain circumstances, a simple edge-adaptive deinterlacing fails to correctly estimate the edge direction. As shown in FIG. 1, the deinterlaced frames FR_D(n−1) and FR_D(n), compared with the original frames FR_I(n−1) and FR_I(n) respectively, contain distorted images. Therefore, the pixel value at a certain position of a current deinterlaced frame, which is a deinterlaced output frame, may be significantly different from that at the same position in the adjacent deinterlaced frame (i.e., a previous deinterlaced frame or a next deinterlaced frame). As the human eyes are sensitive to temporal flickers due to temporal difference, the video quality of the deinterlaced output is degraded due to serious flickers perceived by the user.

Therefore, a method and related apparatus which can efficiently eliminate or alleviate flickers between two deinterlaced frames successively displayed on a display screen are highly demanded.

SUMMARY OF THE INVENTION

It is therefore one of the objectives of the present invention to provide a method and apparatus of processing interlaced video data to generate each output frame by blending deinterlaced frames.

According to one aspect of the present invention, a method of processing interlaced video data including a first interlaced field and a second interlaced field is provided. The method includes performing a deinterlacing operation upon the interlaced video data to generate a first deinterlaced frame corresponding to the first interlaced field and to generate a second deinterlaced frame corresponding to the second interlaced field; performing motion estimation according to video information derived from the interlaced video data to generate a motion estimation result; and performing a blending operation upon the first deinterlaced frame and the second deinterlaced frame to generate an output frame, wherein the blending operation is based on the motion estimation result and the output frame replaces the second deinterlaced frame. Specifically, the first interlaced field is immediately followed by the second interlaced field.

According to another aspect of the present invention, a video deinterlacing apparatus of processing interlaced video data including a first interlaced field and a second interlaced field is provided. The video deinterlacing apparatus includes a deinterlacing module, a motion estimation module, and a blending module. The deinterlacing module is configured for performing a deinterlacing operation upon the interlaced video data to generate a first deinterlaced frame corresponding to the first interlaced field and to generate a second deinterlaced frame corresponding to the second interlaced field. The motion estimation module is configured for performing motion estimation according to video information derived from the interlaced video data to generate a motion estimation result. The blending module is coupled to the deinterlacing module and the motion estimation module, and is configured for performing a blending operation upon the first deinterlaced frame and the second deinterlaced frame to generate an output frame. The blending module performs according to the motion estimation result, and the output frame replaces the second deinterlaced frame.

In contrast to the conventional deinterlacing mechanism which directly outputs the deinterlaced frames as the deinterlacing result, an exemplary deinterlacing mechanism of the present invention further blends successive deinterlaced frames according to a result of field-based motion estimation or frame-based motion estimation to thereby generate an output frame corresponding to each interlaced field included in the interlaced video data. In this way, the undesired flickers perceivable to the user can be efficiently eliminated or alleviated, which improves the video quality greatly.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

When an LCD monitor displays the video frame by frame, the human eyes will be sensitive to the temporal change of pixel value. If the temporal change is significant, the viewer will feel that the video is flickering. A perfect edge-adaptive deinterlace method can interpolate the missed pixel accurately, and the flicker will not happen. However, for most of the existing edge-adaptive deinterlace methods, the interpolation is not perfect, which will cause the temporal change of pixel value. Under this circumstance, the flicker is inevitable. In the proposed blending-based deinterlace according to the present invention, the blending method will not only re-modify the interpolated pixel, but also adjust the real pixel value that should not need interpolation. Since these modifications are based on the previous displayed frame, the temporal change of pixel value will not as significant as those deinterlace methods without blending.

In accordance with exemplary embodiments of the present invention detailed hereinafter, a method and related apparatus are proposed for processing an interlaced video data to generate each output frame corresponding to an interlaced field by blending at least two deinterlaced frames to thereby eliminate or alleviate flickers perceivable to the user. More specifically, weighting factors of the deinterlaced frames are adaptively set according to a motion estimation result. The technical features of the present invention are detailed as follows.

Figure 1:
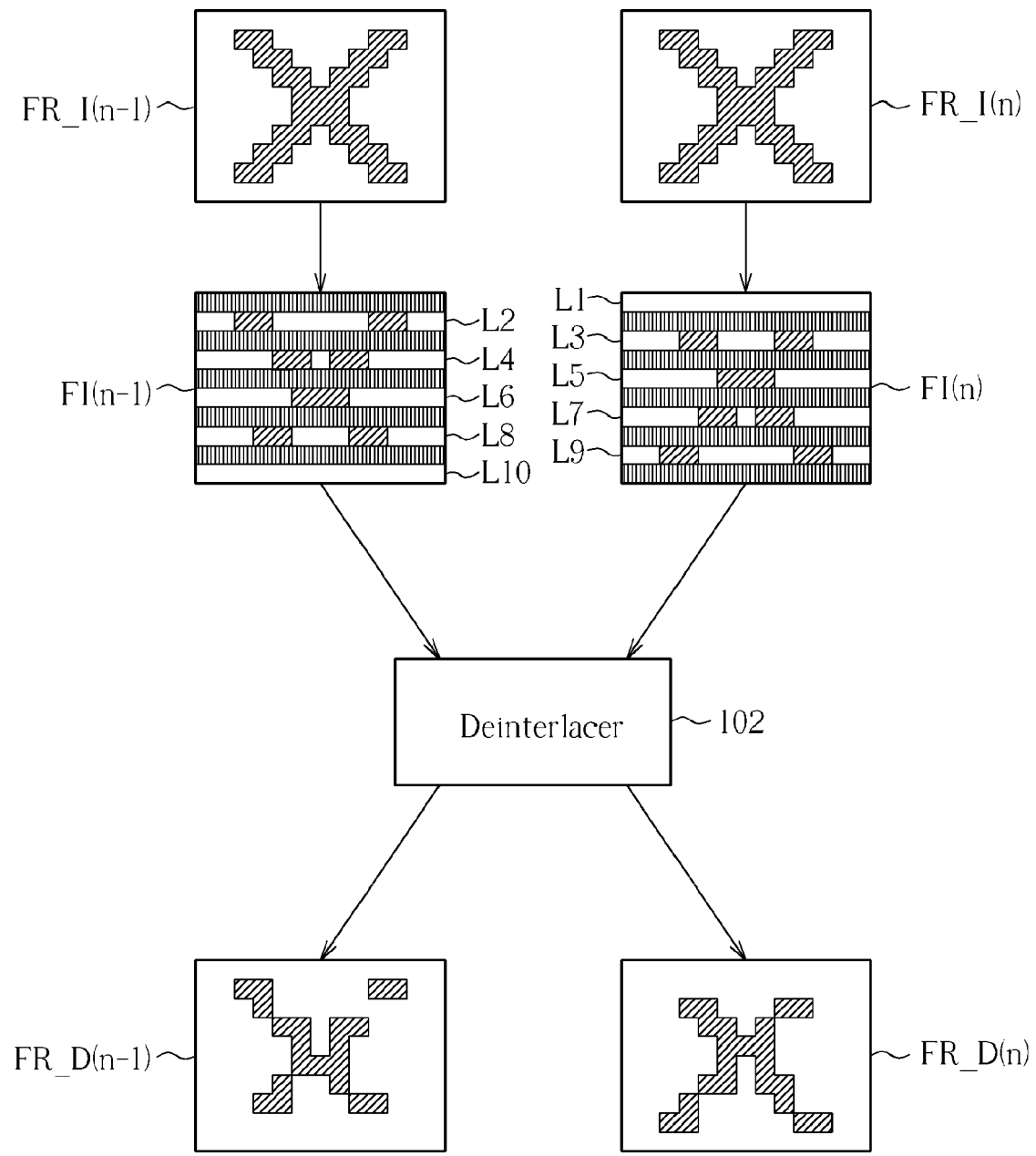
FIG. 1 is a diagram illustrating a conventional deinterlacing operation.
Figure 2:
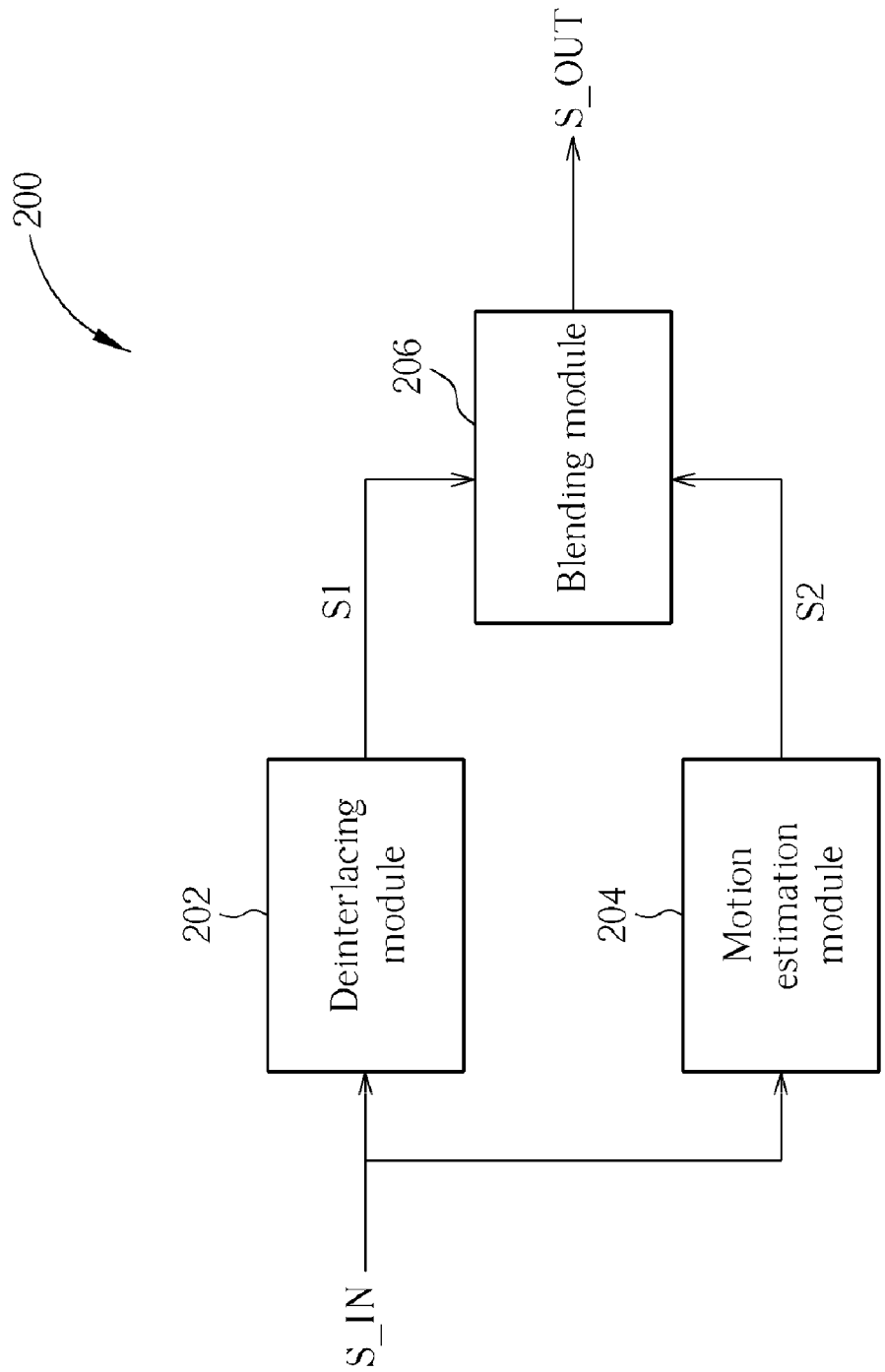
FIG. 2 is a block diagram illustrating one exemplary embodiment of a video deinterlacing apparatus according to the present invention.

Please refer to FIG. 2. FIG. 2 is a block diagram illustrating one exemplary embodiment of a video deinterlacing apparatus according to the present invention. The video deinterlacing apparatus 200 is configured to processing interlaced video data S_IN received from a source end, such as a TV service provider or a storage medium. In this exemplary embodiment, the video deinterlacing apparatus 200 includes, but is not limited to, a deinterlacing module 202, a motion estimation module 204, and a blending module 206. The deinterlacing module 202 is implemented for processing the interlaced video data S_IN to generate a deinterlacing result S1. For example, the interlaced video data S_IN include a first interlaced field (e.g., the interlaced field FI(n−1) shown in FIG. 1) and a second interlaced field (e.g., the interlaced field FI(n) shown in FIG. 1), and the deinterlacing module 202 employs an edge-adaptive deinterlacing technique to generate a first deinterlaced frame (e.g., the deinterlaced frame FR_D(n−1) shown in FIG. 1) and a second deinterlaced frame (e.g., the deinterlaced frame FR_D(n) shown in FIG. 1) corresponding to the first interlaced field and the second interlaced field, respectively.

Figure 3:
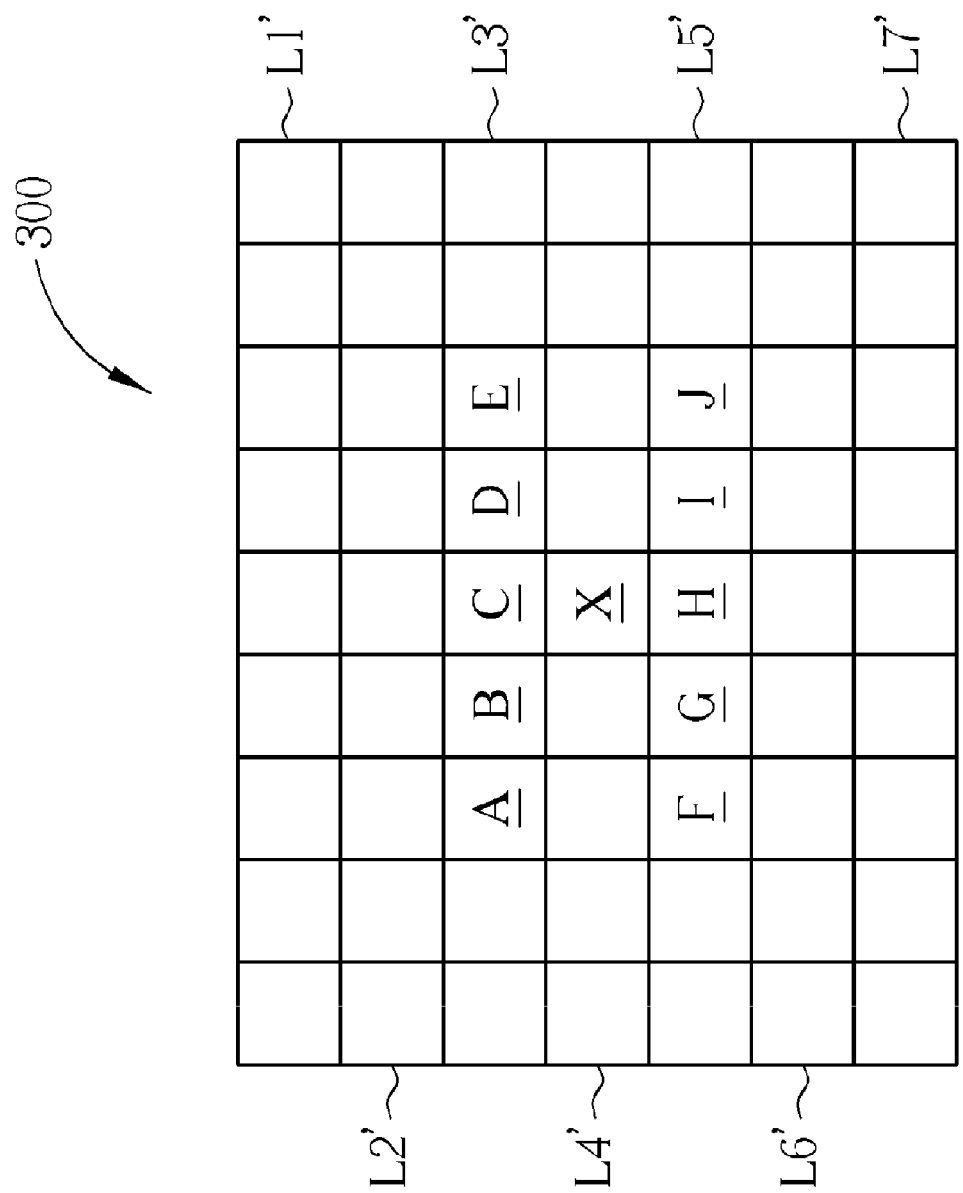
FIG. 3 is a diagram illustrating an exemplary odd filed having even scan lines to be interpolated by a deinterlacing module which employs an edge-adaptive deinterlacing technique according to the present invention.

Please refer to FIG. 3. FIG. 3 is a diagram illustrating an exemplary odd filed having even scan lines to be interpolated by the deinterlacing module 202 shown in FIG. 2. As shown in FIG. 3, the odd field 300 includes odd scan lines L1', L3', L5' and L7', and even scan lines L2', L4', and L6' are to be interpolated using the deinterlacing module 202 which employs an edge-adaptive deinterlacing technique according to the present invention. When estimating an pixel value of the pixel X located in a scan line to be interpolated (i.e., the even scan line L4'), the deinterlacing module 202 first calculates absolute values of a plurality of pixel value differences corresponding to a plurality of different directions with respect to the pixel X, wherein each of the pixel value differences is between a pixel value of a pixel located in an adjacent scan line preceding the scan line to be interpolated (the odd scan line L3') and a pixel value of a pixel located in an adjacent scan line following the scan line to be interpolated (i.e., the odd scan line L5'). Specifically, in this exemplary embodiment of edge-adaptive deinterlace, a plurality of absolute pixel value differences Abs(A−J), Abs(B−I), Abs(C−H), Abs(D−G), and Abs (E−F) are derived, in which Abs(A−J) represents the absolute value of the pixel value difference between pixels A and J, Abs(B−I) represents the absolute value of the pixel value difference between pixels B and I, Abs(C−H) represents the absolute value of the pixel value difference between pixels C and H, Abs(D−G) represents the absolute value of the pixel value difference between pixels D and G, and Abs (E−F) represents the absolute value of the pixel value difference between pixels E and F. Next, the deinterlacing module 202 finds a minimum value among the calculated absolute pixel value differences Abs(A–J), Abs(B–I), Abs(C–H), Abs(D–G), and Abs (E–F). Finally, the pixel value of the pixel X is interpolated along the direction that leads to the minimum absolute pixel value difference. For example, if the absolute pixel value difference Abs(D–G) is the minimum among all the absolute pixel value differences Abs(A–J), Abs(B–I), Abs(C–H), Abs(D–G), and Abs (E–F), the pixel value of the pixel X is interpolated as an average value of the pixel values of the pixels D and G, i.e., (D+G)/2. In accordance with the exemplary edge-adaptive deinterlacing mentioned above, pixel values of all the pixels located in the scan lines to be interpolated can be derived.

The motion estimation module 204 is implemented for performing motion estimation according to video information derived from the interlaced video data S_IN, thereby generating a motion estimation result S2 to the blending module 206. The video information derived from the interlaced video data includes the positions of the feature points. The motion estimation of the interlaced video data can be done by tracking several feature points between two frames or fields. That is to say, the motion estimation performed by the motion estimation module 204 could be frame-based motion estimation or field-based motion estimation, depending upon actual design requirements. By way of example, regarding a specific block in one frame/field, a block matching operation can be implemented to find a candidate block from the other frame/filed, wherein the candidate block is identical to or most similar to the specific block. The distance between the specific block in one frame/field and the candidate block found in the other frame/field is referenced to estimate the motion. Therefore, if these feature points do not change their positions, then there is no motion. Otherwise, the strength of the motion can be estimated by computing how far they change their positions. However, this is for illustrative purposes only, and is not meant to be a limitation of the present invention. More specifically, any algorithm capable of estimating the motion based on video information derived from the interlaced video data can be employed by the motion estimation module implemented in the exemplary video deinterlacing apparatus of the present invention. These alternative designs all obey the spirit of the present invention, and fall within the scope of the present invention. In this exemplary embodiment, the motion estimation module 204 performs motion estimation on the interlaced fields derived from the incoming interlaced video data S_IN to generate the motion estimation result S2.

The blending module 206 is coupled to the deinterlacing module 202 and the motion estimation module 204, and is implemented for performing a blending operation upon the deinterlacing result S1 according to the motion estimation result S2 to thereby generate a deinterlacing output S_OUT of the video deinterlacing apparatus 200. The blending module 206 stores the deinterlacing output S_OUT, and then outputs the deinterlacing output S_OUT to following signal processing stage(s) used for displaying video contents carried via the deinterlacing output S_OUT on a display screen. For example, the deinterlacing result S1 includes a first deinterlaced frame (e.g., the deinterlaced frame FR_D(n–1) shown in FIG. 1) and a second deinterlaced frame (e.g., the deinterlaced frame FR_D(n) shown in FIG. 1), and the blending module 206 blends the first and second deinterlaced frames according to the motion estimation result S2 to generate an output frame FR_O(n) corresponding to the second interlaced field (e.g., the interlaced field FI(n) shown in FIG. 1), and the output frame FR_O(n) replaces the original second deinterlaced frame. Next, the image content of the output frame FR_O(n) is displayed on a display screen. It should be noted that the deinterlacing module 202, the motion estimation module 204, and the blending module 206 shown in FIG. 2 can be implemented using hardware, software, or a combination thereof. These all obey the spirit of the present invention, and fall within the scope of the present invention.

Figure 4:
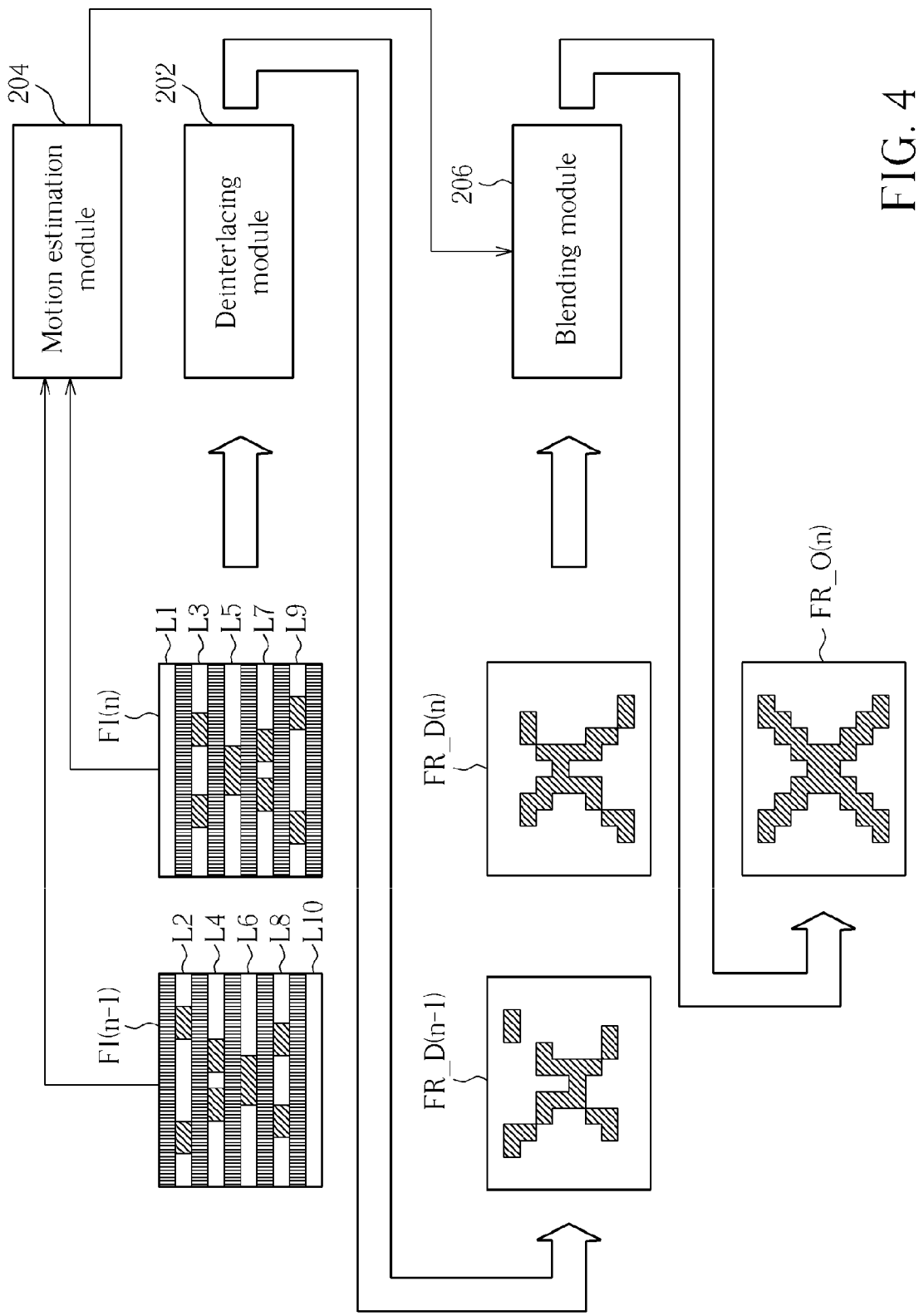
FIG. 4 is a diagram illustrating a first exemplary implementation of processing interlaced video data using the video deinterlacing apparatus shown in FIG. 2.

Please refer to FIG. 4. FIG. 4 is a diagram illustrating a first exemplary implementation of processing the interlaced video data using the video deinterlacing apparatus 200 shown in FIG. 2. In this exemplary implementation, the deinterlacing module 202 generates successive deinterlaced frames FR_D (n–1) and FR_D(n) respectively corresponding to the interlaced field FI(n–1) that is an even field including pixel data of even scan lines L2, L4, L6, L8, L10 and the interlaced field FI(n) that is an odd field including pixel data of odd scan lines L1, L3, L5, L7, and L9. For example, the edge-adaptive deinterlacing technique is employed by the deinterlacing module 202 for deriving the interlaced fields FI(n–1) and FI(n). As one can see, the motion estimation module 204 performs motion estimation on successive interlaced fields FI(n–1) and FI(n) to generate a motion estimation result to the blending module 206. It should be noted that in this exemplary implementation, the interlaced field FI(n) immediately follows the interlaced field FI(n–1) in time domain; in addition, one of the interlaced fields FI(n–1) and FI(n) is an odd field (top field), and the other of the interlaced fields FI(n–1) and FI(n) is an even field (bottom field). However, this is for illustrative purposes only, and is not meant to be a limitation of the present invention. Any deinterlacing operation using a blending operation to convert original deinterlaced frames into adjusted deinterlaced frames obeys the spirit of the present invention, and falls within the scope of the present invention.

The blending module 206 determines a first weighting factor $\alpha$ for the deinterlaced frames FR_D(n–1) and a second weighting factor $\beta$ for the deinterlaced frame FR_D(n) according to the motion estimation result derived from performing motion estimation on the interlaced fields FI(n–1) and FI(n). In a case where the motion estimation result indicates that an estimated motion exceeds a specific level, the blending module 206 assigns a first value to the first weighting factor $\alpha$, and assigns a second value to the second weighting factor $\beta$; in another case where the motion estimation result indicates that the estimated motion does not exceed the specific level, the blending module 206 assigns a third value that is greater than the first value to the first weighting factor $\alpha$, and assigns a fourth value that is smaller than the second value to the second weighting factor $\beta$. In other words, when the estimated motion becomes greater, the blending module 206 decreases the first weighting factor $\alpha$, but increases the second weighting factor $\beta$; on the other hand, when the estimated motion becomes smaller, the blending module 206 increases the first weighting factor $\alpha$, bus decreases the second weighting factor $\beta$.

Please note that in a preferred design, a value assigned to the second weighting factor $\beta$ is not smaller than a value assigned to the first weighting factor $\alpha$, regardless of magnitude of the estimated motion determined by the motion estimation module 204. That is to say, the current deinterlaced frame FR_D(n) is the dominant basis of the current output frame FR_O(n), thereby avoiding or alleviate undesired image quality degradation due to the previous deinterlaced frame FR_D(n–1).

After the first weighting factor $\alpha$ and the second weighting factor $\beta$ are successfully obtained based on the motion estimation result, the blending module 206 blends the deinterlaced frames FR_D(n–1) and FR_D(n) to generate the output frame FR_O(n). For example, a pixel-based blending is adopted in this exemplary implementation. The generation of the output frame FR_O(n) therefore can be expressed using following equation:

$$FR\_O(n)=\alpha*FR\_D(n-1)+\beta*FR\_D(n), \text{ where } \alpha+\beta=1 \quad (1)$$

Regarding a special case where the motion estimation result indicates that there is no motion, implying that the interlaced fields FI(n−1) and FI(n) correspond to a still image, the first weighting factor α and the second weighting factor β could be set using aforementioned rules, or alternatively set by zero and one respectively.

Figure 5:
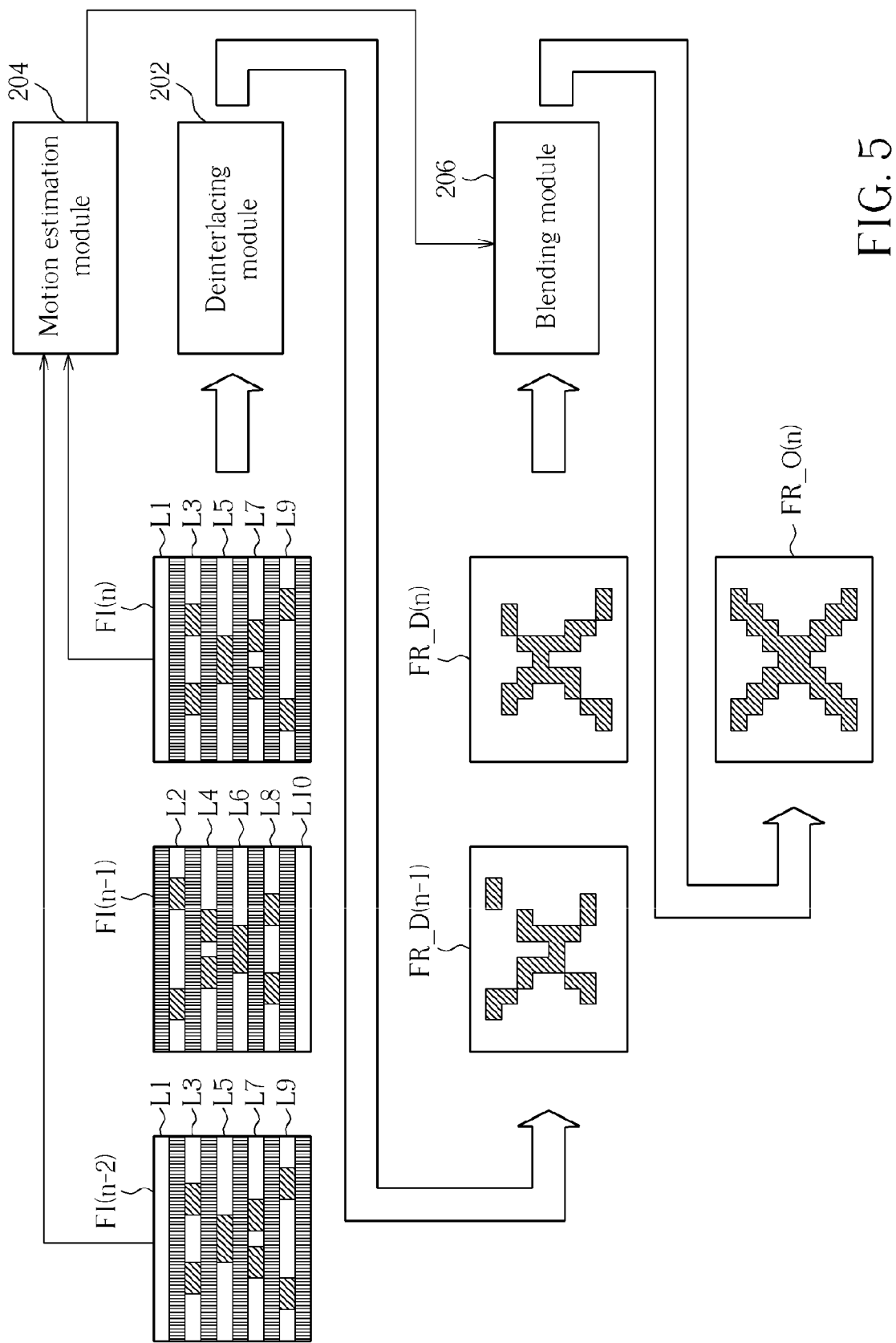
FIG. 5 is a diagram illustrating a second exemplary implementation of processing interlaced video data using the video deinterlacing apparatus shown in FIG. 2.

Please refer to FIG. 5. FIG. 5 is a diagram illustrating a second exemplary implementation of processing the interlaced video data using the video deinterlacing apparatus 200 shown in FIG. 2. In this exemplary implementation, the deinterlacing module 202 generates successive deinterlaced frames FR_D(n−1) and FR_D(n) respectively corresponding to the interlaced fields FI(n−1) and FI(n). The major difference between the implementations shown in FIG. 4 and FIG. 5 is that the motion estimation module 204 shown in FIG. 5 performs motion estimation on interlaced fields FI(n−2) and FI(n) rather than interlaced fields FI(n−1) and FI(n). Please note that the interlaced fields FI(n−2), FI(n−1) and FI(n) are successive in time domain. That is, the interlaced field FI(n−2) is immediately followed by the interlaced field FI(n−1), and the interlaced fields FI(n−1) is immediately followed by the interlaced fields FI(n). As one can see, the interlaced fields FI(n−2) and FI(n) have the same field type, whereas the interlaced field FI(n−1) between the interlaced fields FI(n−2) and FI(n) has a different field type. As shown in FIG. 5, the interlaced fields FI(n−2) and FI(n) are even fields each including pixel data of even scan lines L2, L4, L6, L8, L10, and the interlaced field FI(n−1) is an odd field including pixel data of odd scan lines L1, L3, L5, L7, L9.

The blending module 206 then determines a first weighting factor α for the deinterlaced frame FR_D(n−1) and a second weighting factor β for the deinterlaced frame FR_D(n) according to the motion estimation result derived from performing motion estimation on the interlaced fields FI(n−2) and FI(n). After the first weighting factor α and the second weighting factor β are derived, the blending module 206 blends the deinterlaced frames FR_D(n−1) and FR_D(n) to generate the output frame FR_O(n). As a person skilled in the pertinent art can readily understand the algorithm of computing the weighting factors and the operation of blending the deinterlaced frames after reading above paragraphs directed to the exemplary implementation shown in FIG. 4, further description is omitted here for the sake of brevity.

Figure 6:
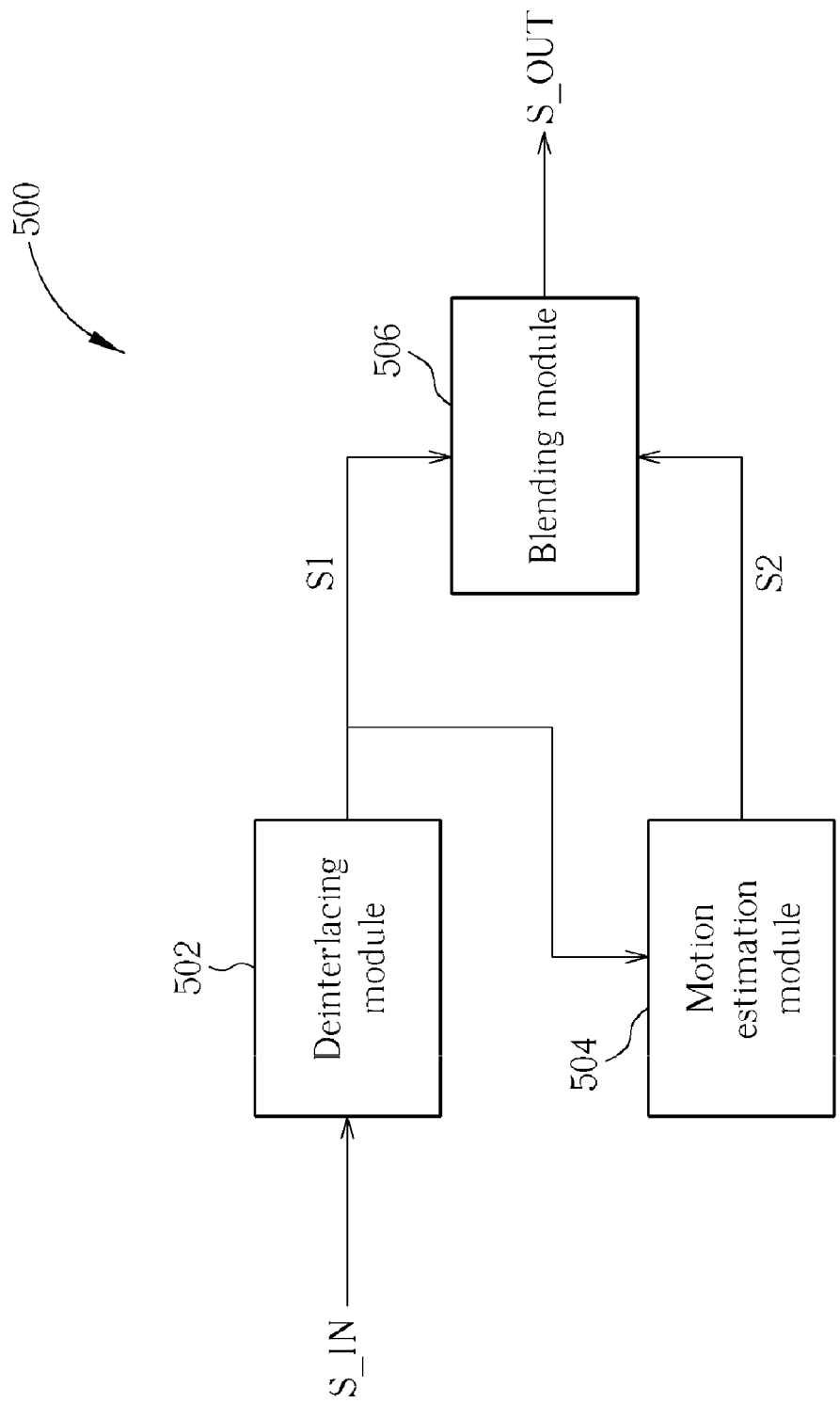
FIG. 6 is a block diagram illustrating another exemplary embodiment of a video deinterlacing apparatus according to the present invention.

Please refer to FIG. 6. FIG. 6 is a block diagram illustrating another exemplary embodiment of a video deinterlacing apparatus according to the present invention. In this exemplary embodiment, the video deinterlacing apparatus 500 includes, but is not limited to, a deinterlacing module 502, a motion estimation module 504, and a blending module 506. The operation and function of the deinterlacing module 502 is identical to that of the deinterlacing module 202 shown in FIG. 2. For example, the deinterlacing module 502 employs the aforementioned edge-adaptive deinterlacing technique to derive the pixel value of the pixel to be interpolated according to pixel values of pixels located in adjacent scan lines, as shown in FIG. 3. Further description is therefore omitted here for the sake of brevity.

In this exemplary embodiment, the motion estimation module 504 is implemented for performing motion estimation on a deinterlacing result S1 of the deinterlacing module 502 to thereby generate a motion estimation result S2 to the blending module 506. Next, the blending module 506 performs a blending operation upon the deinterlacing result S1 according to the motion estimation result S2, thereby generating a deinterlacing output S_OUT of the video deinterlacing apparatus 500. For example, the deinterlacing result S1 includes a first deinterlaced frame and a second deinterlaced frame, and the blending module 506 blends the first and second deinterlaced frames according to the motion estimation result S2 provided by the motion estimation module 504 to generate an output frame. It should be noted that the deinterlacing module 502, the motion estimation module 504, and the blending module 506 shown in FIG. 6 can be implemented using hardware, software, or a combination thereof. These all obey the spirit of the present invention, and fall within the scope of the present invention.

Figure 7:
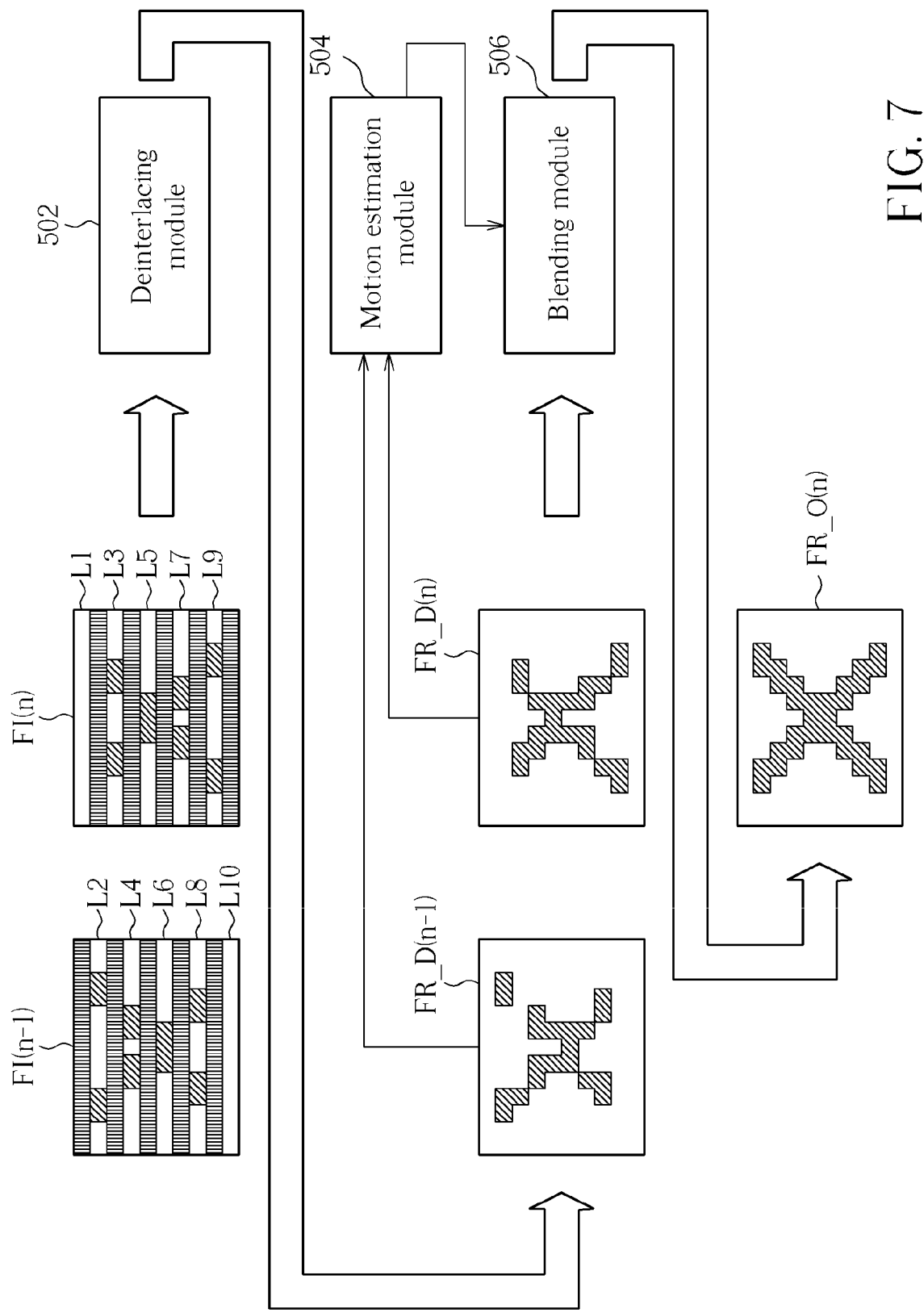
FIG. 7 is a diagram illustrating an exemplary implementation of processing interlaced video data using the video deinterlacing apparatus shown in FIG. 6.

Please refer to FIG. 7. FIG. 7 is a diagram illustrating an exemplary implementation of processing the interlaced video data using the video deinterlacing apparatus 500 shown in FIG. 6. In this exemplary implementation, the deinterlacing module 502 generates successive deinterlaced frames FR_D(n−1) and FR_D(n) respectively corresponding to the interlaced field FI(n−1) that is an even filed including pixel data of even scan lines L2, L4, L6, L8, L10 and the interlaced field FI(n) that is an odd field including pixel data of odd scan lines L1, L3, L5, L7, L9. For example, an edge-adaptive deinterlacing technique is employed by the deinterlacing module 502. The motion estimation module 504 performs motion estimation on deinterlaced frames FR_D(n−1) and FR_D(n) to generate the motion estimation result to the blending module 506.

The blending module 506 then determines a first weighting factor α for the deinterlaced frame FR_D(n−1) and a second weighting factor β for the deinterlaced frame FR_D(n) according to the motion estimation result derived from performing motion estimation on the deinterlaced frames FR_D(n−1) and FR_D (n). After the first weighting factor α and the second weighting factor β are derived, the blending module 506 blends the deinterlaced frames FR_D(n−1) and FR_D(n) to generate the output frame FR_O(n). As a person skilled in the pertinent art can readily understand the algorithm of computing the weighting factors and the operation of blending the deinterlaced frames after reading above paragraphs directed to the exemplary implementation shown in FIG. 4, further description is omitted here for the sake of brevity.

Figure 8:
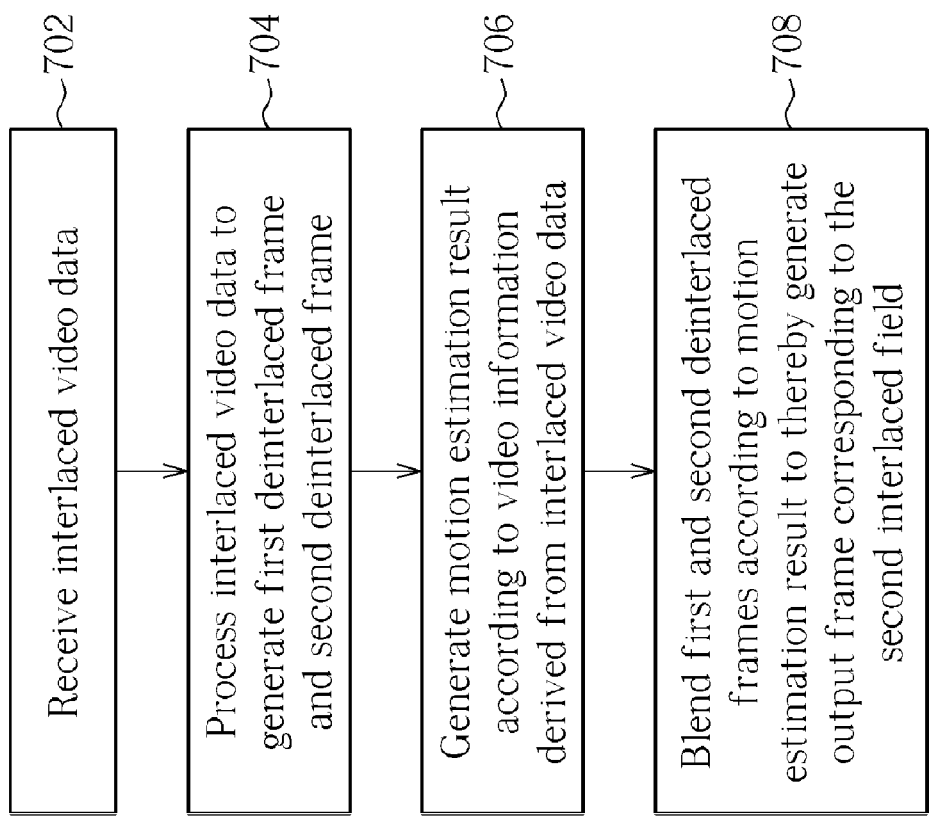
FIG. 8 is a flowchart illustrating a generalized method employed by the video deinterlacing apparatuses shown in FIG. 2 and FIG. 6 for processing interlaced video data.

In view of above disclosure, a method employed by the video deinterlacing apparatuses 200 and 500 for processing interlaced video data could be briefly summarized using the flow shown in FIG. 8. Please note that if the result is substantially the same, the steps are not limited to be executed in the exact order shown in FIG. 8. The flow of generating an output frame includes following steps. An interlaced video data is received from a source end (e.g., a TV service provider or a storage medium) in Step 702. The interlaced video data includes a first interlaced field and a second interlaced field. In Step 704, the interlaced video data is processed by a deinterlacing operation to generate a first deinterlaced frame corresponding to a first interlaced field and a second deinterlaced frame corresponding to a second interlaced field. Motion estimation is performed in step 706 according to video information derived from the interlaced video data to thereby generate a motion estimation result. In one exemplary embodiment, the motion estimation is performed on the interlaced fields derived from the incoming interlaced video data to generate the motion estimation result. In step 708, a blending operation is performed upon the first deinterlaced frame and the second deinterlaced frame according to the motion estimation result to thereby generate an output frame corresponding to the second interlaced field.

As a person skilled in the art can readily understand operation of each step included in the exemplary flow in FIG. 8 after reading above paragraphs, further description is omitted here for the sake of brevity.

In contrast to the conventional deinterlacing mechanism directly outputting deinterlaced frames as a deinterlacing result, the exemplary deinterlacing mechanism of the present invention further blends successive deinterlaced frames according to a result of field-based motion estimation or frame-based motion estimation to thereby generate an output frame corresponding to each interlaced field included in the interlaced video data, and the output frame replaces the second deinterlaced frame. In this way, the undesired flickers perceivable to the user can be efficiently eliminated or alleviated.

Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The process of the example embodiment(s) can be implemented in hardware, software, firmware, or a combination thereof. In example embodiments, the process is implemented in software or firmware that is stored in a memory and that is executed by a suitable instruction execution system. If implemented in hardware, as in an alternative embodiment, the process can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Those skilled in the art will readily observe that numerous modifications and alterations of the device and method may be made while retaining the teachings of the invention.

What is claimed is:

1. A method of processing interlaced video data including a first interlaced field and a second interlaced field, comprising:
   performing a deinterlacing operation upon the interlaced video data to generate a first deinterlaced frame corresponding to the first interlaced field and to generate a second deinterlaced frame corresponding to the second interlaced field;
   performing motion estimation according to video information derived from the interlaced video data to generate a motion estimation result; and
   performing a blending operation upon the first deinterlaced frame and the second deinterlaced frame to generate an output frame, wherein the blending operation is based on the motion estimation result and the output frame replaces the second deinterlaced frame.

2. The method of claim 1, wherein the first interlaced field is immediately followed by the second interlaced field.

3. The method of claim 1, wherein performing the motion estimation according to video information derived from the interlaced video data comprises:
   performing the motion estimation upon the first interlaced field and the second interlaced field to generate the motion estimation result.

4. The method of claim 1, wherein performing the motion estimation according to video information derived from the interlaced video data comprises:
   performing the motion estimation upon the first deinterlaced frame and the second deinterlaced frame to generate the motion estimation result.

5. The method of claim 1, wherein performing the motion estimation according to video information derived from the interlaced video data comprises:
   performing the motion estimation upon a third deinterlaced field and the second interlaced field to generate the motion estimation result, wherein the first interlaced field is between the third interlaced field and the second interlaced field.

6. The method of claim 1, wherein performing the blending operation upon the first deinterlaced frame and the second deinterlaced frame comprises:
   determining a first weighting factor for the first deinterlaced frame and a second weighting factor for the second deinterlaced frame according to the motion estimation result; and
   blending the first deinterlaced frame and the second deinterlaced frame according to the first weighting factor and the second weighting factor, thereby generating the output frame.

7. The method of claim 6, wherein determining the first weighting factor for the first deinterlaced frame and the second weighting factor for the second deinterlaced frame comprises:
   when the motion estimation result indicates that an estimated motion exceeds a specific level, assigning a first value to the first weighting factor and assigning a second value to the second weighting factor; and
   when the motion estimation result indicates that the estimated motion does not exceed the specific level, assigning a third value to the first weighting factor and assigning a fourth value to the second weighting factor, wherein the first value is smaller than the third value, and the second value is greater than the fourth value.

8. The method of claim 7, wherein a value assigned to the second weighting factor is not smaller than a value assigned to the first weighting factor, regardless of magnitude of the estimated motion determined by the motion estimation.

9. The method of claim 1, wherein performing the deinterlacing operation comprises:
for each interlaced field included in the interlaced video data, performing an edge-adaptive deinterlacing operation upon the interlaced field to generate a corresponding deinterlaced frame.

10. The method of claim 9, wherein performing the edge-adaptive deinterlacing operation comprises:
for each pixel located in a scan line to be interpolated:
calculating absolute values of a plurality of pixel value differences corresponding to a plurality of different directions with respect to the pixel located in the scan line to be interpolated, wherein each of the pixel value differences is between a pixel value of a pixel located in an adjacent scan line preceding the scan line to be interpolated and a pixel value of a pixel located in an adjacent scan line following the scan line to be interpolated;
finding a minimum value among the absolute values of the pixel value differences; and
referring to pixel values that are located in the adjacent scan lines respectively and correspond to the minimum value for determining a pixel value of the pixel located in the scan line to be interpolated.

11. A video deinterlacing apparatus of processing interlaced video data including a first interlaced field and a second interlaced field, comprising:
a deinterlacing module, configured for performing a deinterlacing operation upon the interlaced video data to generate a first deinterlaced frame corresponding to the first interlaced field and to generate a second deinterlaced frame corresponding to the second interlaced field;
a motion estimation module, configured for performing motion estimation according to video information derived from the interlaced video data to generate a motion estimation result; and
a blending module, coupled to the deinterlacing module and the motion estimation module, the blending module configured for performing a blending operation upon the first deinterlaced frame and the second deinterlaced frame to generate an output frame, wherein the blending module performs according to the motion estimation result, and the output frame replaces the second deinterlaced frame.

12. The video deinterlacing apparatus of claim 11, wherein the first interlaced field is immediately followed by the second interlaced field.

13. The video deinterlacing apparatus of claim 11, wherein the motion estimation module performs the motion estimation upon the first interlaced field and the second interlaced field to generate the motion estimation result.

14. The video deinterlacing apparatus of claim 11, wherein the motion estimation module performs the motion estimation upon the first deinterlaced frame and the second deinterlaced frame to generate the motion estimation result.

15. The video deinterlacing apparatus of claim 11, wherein the motion estimation module performs the motion estimation upon a third deinterlaced field and the second interlaced field to generate the motion estimation result, where the first interlaced field is between the third interlaced field and the second interlaced field.

16. The video deinterlacing apparatus of claim 11, wherein the blending module determines a first weighting factor for the first deinterlaced frame and a second weighting factor for the second deinterlaced frame according to the motion estimation result, and blends the first deinterlaced frame and the second deinterlaced frame according to the first weighting factor and the second weighting factor, thereby generating the output frame.

17. The video deinterlacing apparatus of claim 16, wherein when the motion estimation result indicates that an estimated motion exceeds a specific level, the blending module assigns a first value to the first weighting factor and assigns a second value to the second weighting factor; and when the motion estimation result indicates that the estimated motion does not exceed the specific level, the blending module assigns a third value to the first weighting factor and assigns a fourth value to the second weighting factor, where the first value is smaller than the third value, and the second value is greater than the fourth value.

18. The video deinterlacing apparatus of claim 17, wherein a value assigned to the second weighting factor by the blending module is not smaller than a value assigned to the first weighting factor by the blending module, regardless of magnitude of the estimated motion determined by the motion estimation module.

19. The video deinterlacing apparatus of claim 11, wherein:
for each interlaced field included in the interlaced video data, the deinterlacing module performs an edge-adaptive deinterlacing operation upon the interlaced field to generate a corresponding deinterlaced frame.

20. The video deinterlacing apparatus of claim 19, wherein the edge-adaptive deinterlacing operation performed by the deinterlacing module comprises:
for each pixel located in a scan line to be interpolated:
calculating absolute values of a plurality of pixel value differences corresponding to a plurality of different directions with respect to the pixel located in the scan line to be interpolated, wherein each of the pixel value differences is between a pixel value of a pixel located in an adjacent scan line preceding the scan line to be interpolated and a pixel value of a pixel located in an adjacent scan line following the scan line to be interpolated;
finding a minimum value among the absolute values of the pixel value differences; and
referring to pixel values that are located in the adjacent scan lines respectively and correspond to the minimum value for determining a pixel value of the pixel located in the scan line to be interpolated.

* * * * *